Oct. 19, 1937.  J. S. STOVER  2,096,142
AUXILIARY GLARE SHIELD
Filed March 9, 1937
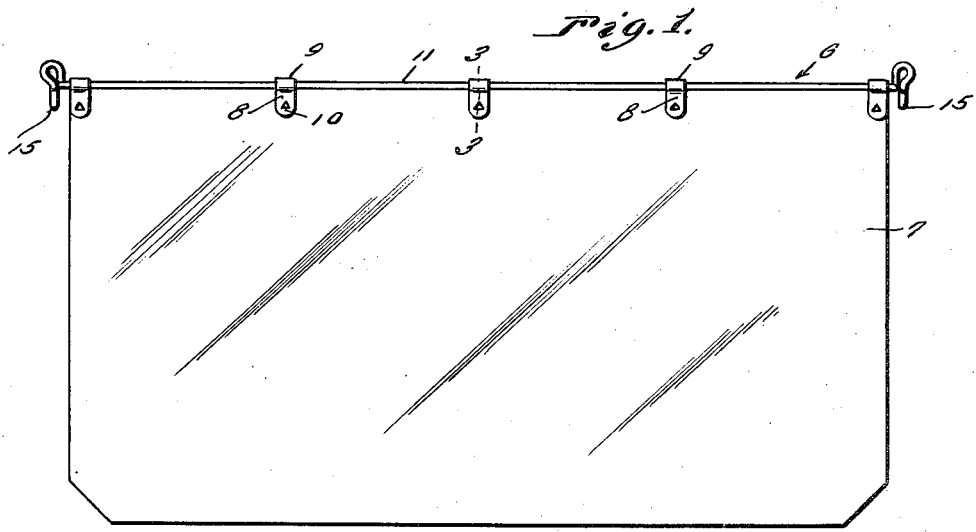
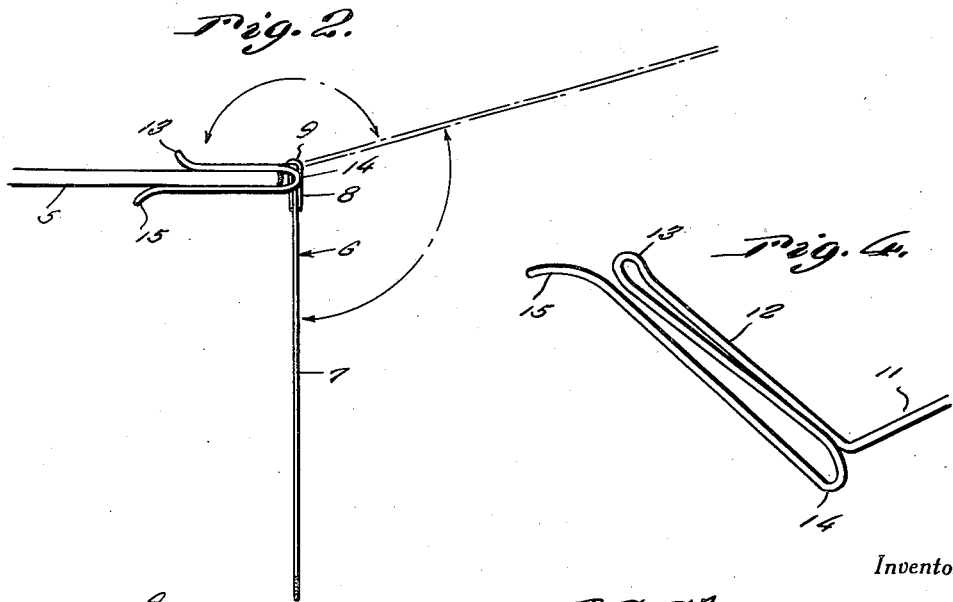
Inventor
J. S. Stover
By Clarence A. O'Brien
Hyman Berman
Attorneys Patented Oct. 19, 1937

2,096,142

UNITED STATES PATENT OFFICE 2,096,142

AUXILIARY GLARE SHIELD

Jerry S. Stover, Rochester, Minn.

Application March 9, 1937, Serial No. 129,926

1 Claim. (Cl. 296—97)

This invention relates to a simple and novel auxiliary or supplementary glare shield in the nature of an attachment detachably connectible with a so-called conventional non-transparent glare shield of the type used as a sun visor in present day automobiles.

The conventional sun visor referred to in the preceding paragraph is, ordinarily speaking, in the nature of a rectangular shield, in most instances non-transparent, and it is pivotally attached on a bracket within the vicinity of the windshield so that it can be swung down within the range of vision of the driver under abnormal driving conditions. It has been my experience to find that present day sun visors and shields are rather limited in capacity, since, when the sun sinks below the horizon and the driver is driving in the direction of the setting sun, the visor now in use is not capable of functioning satisfactorily. Under the circumstances I have evolved and produced a simple extra or auxiliary transparent attachment hingedly and detachably connectible with the regular visor to permit it to be employed in conjunction therewith or independently thereof.

Other features and advantages will become more readily apparent from the following description and drawing.

In the drawing, wherein like numerals are employed to designate like parts throughout the same:

Figure 1 is an elevational view of the attachment constructed in accordance with my aims and ideas.

Figure 2 is an end view of the same showing how it is detachably and hingedly applied to the free swingable end of the regulation or so-called conventional sun visor.

Figure 3 is a detail section on the plane of the line 3—3 of Figure 1.

Figure 4 is a fragmentary perspective view of one end portion of the bent wire attaching frame forming an important feature of the attachment.

In the drawing in Figure 2, the conventional swingable, non-transparent glare shield or so-called sun visor is denoted by the numeral 5. The attachment is indicated by the numeral 6. It comprises a sheet 7 of transparent cellulose which may be conveniently described as colored. It is preferably green or amber, but may be simply smoked to provide the desired view and to proportionately increase its light intercepting and diffusing properties. This drop shield 7 is swingably connected with an attaching frame through the instrumentality of a plurality of simple metal clips 8. The clips are of U-shaped form and the bight portion 9 constitutes the hinge and attaching element, whereas the end portions are disposed in parallelism and formed with apertures and an associated spur 10 to secure the clips to the shield 7 in a reliable and evident manner.

The attaching frame unit is formed from a single length of wire bent upon itself into general U-shaped form. The connective or bight portion of the frame is indicated by the numeral 11 and the ends are indicated at 12. The ends are formed with return bends laterally deflected as indicated at 13. Then the free terminal ends of the wires are bent back upon themselves into parallelism with the end portions 12 to define what may be called U-shaped retention clamps 14. That is to say, each clamp 14 includes resilient gripping jaws, one of which terminates in a curved extremity as indicated at 15 to cooperate with the laterally bent feature 13 to facilitate convenient application of the wire attaching frame to the edge portion of the swingable non-transparent sun visor 5, as indicated in Figure 2.

Considered otherwise, the attaching device comprises a U-shaped frame having auxiliary U-shaped clamps at opposite ends thereof with the clamps having their jaw portions laterally deflected in diverging relationship to facilitate attachment. The metal is of sufficient inherent resiliency to insure safe and reliable retention properties.

Assuming that the device is detachably fastened on the free swingable end of the main shield 5, it is evident that it will increase the area of said shield when it is dropped down to a substantially vertical useful position. That is to say, the shield 5 ordinarily would not swing down into a plane to intercept the glaring run rays at predetermined elevations. The additional area, however, afforded said shield 5 by the attachment thereto of the extension or supplementary shield 6 permits the desired results to be attained. The device 6 can be used independently of the part 5, that is, when the part 5 is in a horizontal position or at right angles to the windshield. This is also evident from Figure 2. As a matter of fact, when the device is not in use, it can be swung up as indicated by the arrows and dotted lines, and swung over to the left in Figure 2 to overlap and rest on top of the shield 5. The gist of the invention, however, resides in the provision of a colored transparency 7 hingedly attachable to a wire frame, said wire frame having clamps at opposite ends readily connectible with a relatively stationary support such as part 5 or any other equivalent structure.

It is thought that the description taken in connection with the drawing will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

An added feature of the invention is the use of the shield as a breath diffuser in cold weather. The perpendicular position, that is, hanging down in the position of approximately ten to fifteen inches from the face of the driver, results in the breath of the driver striking against the cellulose material which does not frost over and it is thereby diffused or deflected from directly striking on the windshield of the car.

I claim:

A hinge support for a shield comprising a substantially U-shaped resilient wire rod, the limbs of which extend at right angles from the bight, means for swingingly connecting one edge of a shield to the bight of the rod, each end of the rod being bent into a substantially U-shaped loop, the end of one limb of which is connected with the end of a limb of the U-shaped rod with the loop extending substantially parallel with said limb, said limb and one limb of the loop forming a resilient jaw and the other limb of the loop forming a second resilient jaw, the bight of the loop extending at substantially right angles from the bight of the U-shaped rod and the ends of the two jaws curving in opposite direction.

JERRY S. STOVER.